United States Patent [19]

Dewald, Jr. et al.

[11] Patent Number: 5,894,698
[45] Date of Patent: Apr. 20, 1999

[54] SEALING MECHANISM FOR SLIDE OUT ROOM

[76] Inventors: James E. Dewald, Jr.; Martin P. McManus; Patrick W. McManus, all of 1023 W. Eighth St., P.O. Box 703, Mishawaka, Ind. 46544

[*] Notice: This patent is subject to a terminal disclaimer.

[21] Appl. No.: 08/956,673

[22] Filed: Oct. 23, 1997

Related U.S. Application Data

[63] Continuation-in-part of application No. 08/789,162, Jan. 24, 1997, abandoned.

[51] Int. Cl.⁶ ..................................................... E04B 1/346
[52] U.S. Cl. .................... 52/67; 52/71; 296/171
[58] Field of Search ...................... 52/67, 71, 64; 296/26, 171

[56] References Cited

U.S. PATENT DOCUMENTS

5,577,351 11/1996 Dewald, Jr. et al. .................. 52/67 X
5,586,802 12/1996 Dewald, Jr. et al. .................. 52/67 X

Primary Examiner—Creighton Smith
Attorney, Agent, or Firm—Baker & Daniels

[57] ABSTRACT

Mobile living quarters, such as manufactured housing or a recreational vehicle, is provided with a structure defining a main living quarters and a slide out room which is extended from the main living quarters when the unit is used, and is retracted into the main living quarters when the unit is to be transported. An actuation mechanism extends and retracts the slide out room, and a pivot mechanism is used to tilt the slide out room slightly in one direction when the slide out room is drawn into the main living area to thereby compress a seal between a sealing area on the slide out room and a sealing surface on the structure defining the main living quarters. When the slide out room is moved to the extended position, the slide out room is tilted in the opposite direction to thereby compress a second seal between another sealing area and a sealing surface.

26 Claims, 8 Drawing Sheets

SEALING MECHANISM FOR SLIDE OUT ROOM

This is a continuation-in-part of U.S. patent application Ser. No. 08/789,162 filed Jan. 24, 1997, abandoned Apr. 20, 1998.

This invention relates to a slide out room for a recreational vehicle or manufactured housing unit and a mechanism for sealing between the slide out room and the structure defining the main living area of the unit.

BACKGROUND AND SUMMARY OF THE INVENTION

The width of recreational vehicles and manufactured housing is limited to that which can be accommodated for traveling on public roads. Accordingly, it is common to provide recreational vehicles and manufactured housing with a slide out room which can be retracted into the main living quarters when the mobile living quarters is moved, but which can be extended from the main living quarters to provide auxiliary living space when the unit is parked for use. Since the interface between the slide out room and the main living quarters provides a path through which rain, dust and other environmental contaminants may enter the unit, it is desirable that a sealant be provided between the slide out room and the structure defining the main living quarters. This is necessary when the room is retracted into the main living quarters, because moisture, dirt and other such contaminants are likely to be drawn into the unit when the unit is being moved on the public roads, but it is also desirable that sealing be provided when the slide out room is extended to prevent rain or snow from entering the unit.

The present invention provides a compressible seal that extends around the side and top walls of the retractable room to seal against a corresponding sealing surface defined on the structure defining the main living when the slide out room is moved into the retracted position. Optionally, a second seal extends around a flange projecting from the inner edge of the slide out room and is engaged with a corresponding sealing area on the main living quarters when the slide out room is moved into the extended position for use as an auxiliary living area. The mechanism which extends and retracts the slide out room is pivotally connected to the actuator, and a stop assembly causes the slide out room to tilt slightly when the room is moved into the retracted position and to tilt slightly in the opposite direction when the room is moved into the extended position. Accordingly, the seals are compressed between their corresponding sealing areas on the slide out rooms and on the structure defining the main living quarters, thereby assuring a waterproof and dust proof seal.

These and other advantages of the present invention will become apparent from the following description, with reference to the accompanying drawings, in which:

BRIEF DESCRIPTION OF THE DRAWINGS

FIG. 3 is an enlarged view in perspective of the actuation mechanism used to extend and retract the retractable room;

FIG. 4 is an enlarged cross sectional view taken substantially along lines 4—4 of FIG. 3;

FIG. 5 is a view similar to FIG. 4, but illustrating an embodiment of the invention in which the room is tilted or cocked only when the room is retracted into the main living quarters;

FIGS. 6 and 7 illustrate schematically the relative positions of the face plate supporting the slide out room when the room is in the retracted position;

FIG. 7 is a view similar to FIG. 6, illustrating the angle assumed by the base plate when the room is extended from the main living quarters;

DETAILED DESCRIPTION OF THE INVENTION

Figure 1:
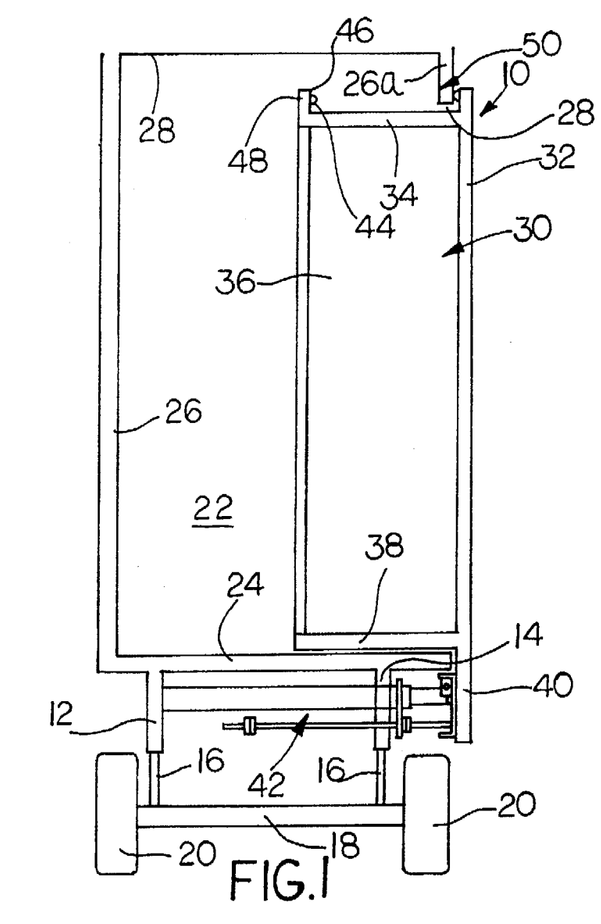
FIG. 1 is a cross sectional view of mobile living quarters incorporating a slide out room and sealing mechanism made pursuant to the teachings of the present invention, the room being shown in the retracted position.
Figure 2:
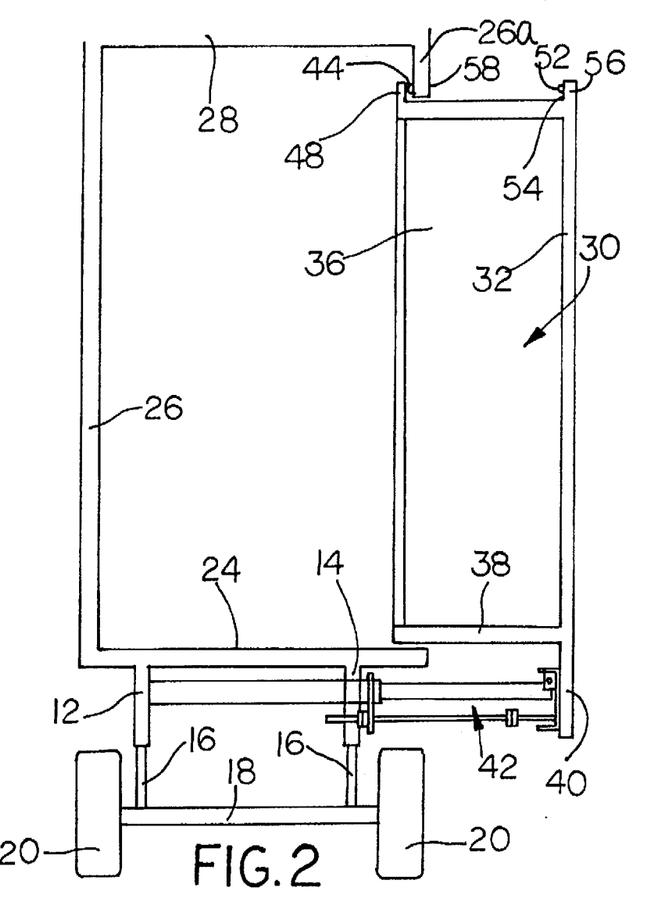
FIG. 2 is a cross sectional view similar to FIG. 1, but illustrating the slide out room in the extended position.
Figure 3:
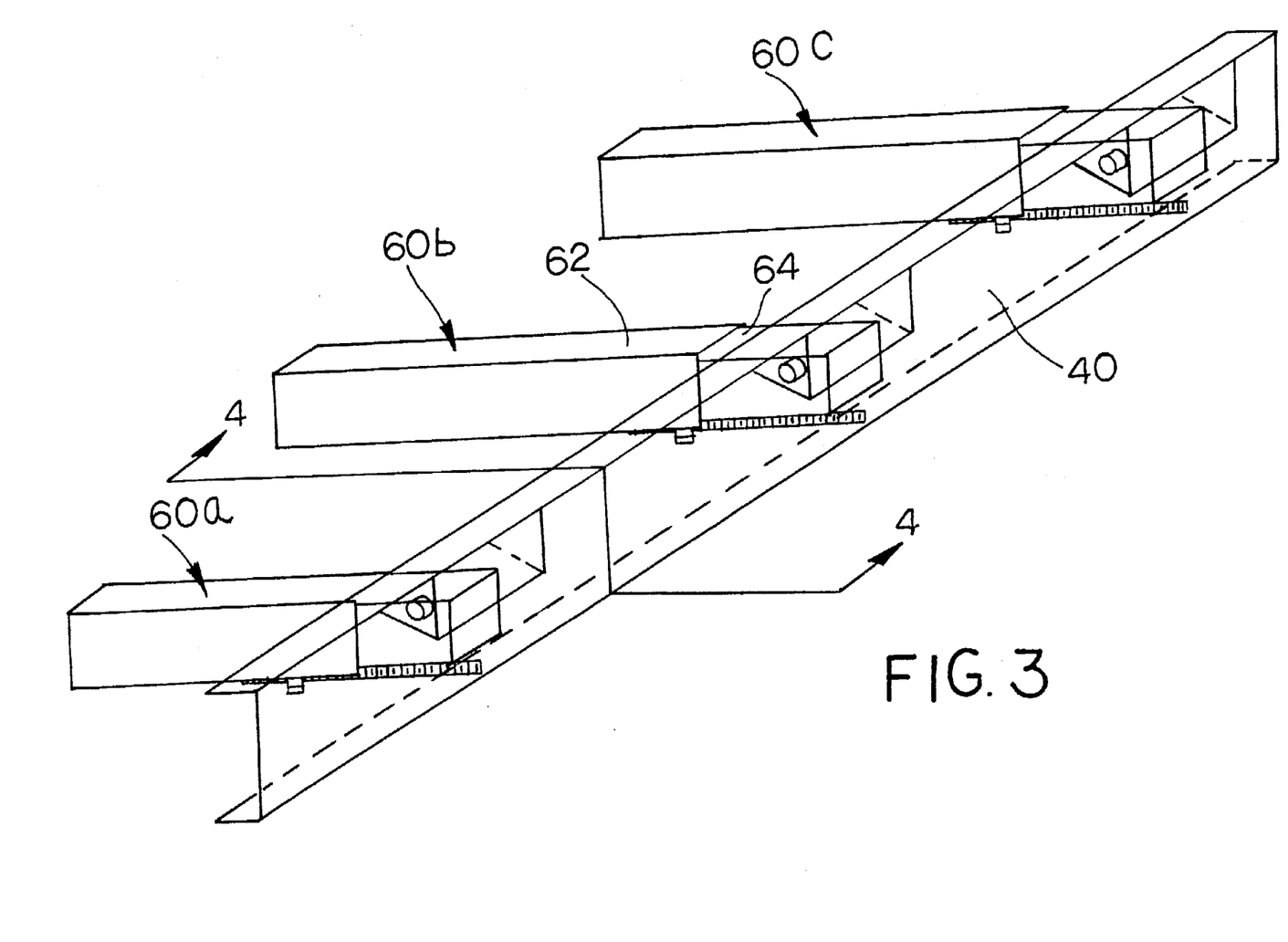
FIG. 3 is a view in perspective of the actuating and tilting mechanism used in the mobile living quarters illustrated in FIGS. 1 and 2.

Referring now to the drawing, mobile living unit generally indicated by the numeral 10 includes frame members 12,14 that extend longitudinally along the length of the unit, and are connected via suspension members 16 to an axle 18 upon which rotatable wheels 20 are mounted. Unit 10 includes a structure defining a main living area 22 which includes a floor 24 which is mounted directly upon the frame members 12,14, sidewalls 26,26a and upper wall or ceiling 28. A portion of the sidewall 26a is cut away to define an opening generally indicated by the numeral 28 through which a retractable or slide out room generally indicated by the numeral 30 extends. The retractable room 30 includes an outer wall 32, a ceiling 34, sidewalls 36, and a floor 38, that slides along the floor 24. The retractable room 30 is supported by a cross plate 40 which extends below the outer wall 32. An actuating mechanism generally indicated by the numeral 42 is supported by the frame members 12,14 and engages the cross plate 40. The actuating mechanism 42 moves the retractable room 30 between the retracted position illustrated in FIG. 1 and the extended position illustrated in FIG. 2.

A compressible seal 44 extends along an inner sealing surface 46 of a flange 48 that projects outwardly from the ceiling 34 and the sidewalls 36 of retractable room 30. The seal 44 is adapted to engage sealing area 50 on the portion of sidewall 26a adjacent the opening 28 when the retractable room 30 is moved into the extended position illustrated in FIG. 2. A second compressible seal 52 engages sealing surface 54 on a flange 56 that projects outwardly from the outer wall 32 of retractable room 30. The seal 52 is adapted to seal against sealing area 58 of the portion of wall 26a opposite the sealing area 50.

Referring now to FIGS. 3, 4, 6 and 7, actuation mechanism 42 includes three actuators 60a, 60b and 60c, all of which are mounted on frame members 12, 14 and are connected to cross plate 40. Actuators 60a, 60b and 60c are actuated simultaneously to extend and retract the retractable room 30. Since all of the actuators 60a,60b and 60c are identical, only actuator 60b will be described in detail. Actuator 60b includes a pair of coaxial, telescoping, tubular members consisting of an outer member 62 and an inner member 64. Outer member 62 is secured to the frame members 12,14. The inner member 64 is extended from, and retracted into, the outer member 62 by any suitable mechanism, such as by a hydraulic cylinder in a manner well known to those skilled in the art.

Inner member 64 is connected to cross plate 40 through a pivot connection 66 which permits pivoting of the slide out room around a generally horizontal axis. A stop assembly includes a control member or threaded rod 68 is slidably received in a support member 70 which is secured to the outer member 62. One end of the rod 68 is pivotally connected to cross plate 40 through a pivot connection 72. The cross plate 40 is biased into the substantially vertical orientation illustrated in FIG. 4 by springs, such as push spring 74 and pull spring 76. The stop assembly further includes a stop or stop nut 78 threadably mounted on threaded rod 68 between pivot 72 and support 70, and is adapted to engage stop surface 80 on support 70 after the inner member 64 is retracted into outer member 62 a sufficient distance. The stop assembly further includes another stop or stop nut 82 threaded on the rod 68 on the portion of the rod that extends through the support 70. The nut 82 is adapted to engage stop surface 84 on support 70 after the inner member 64 is extended from the outer member 52 a sufficient distance. Since the nuts 78 and 82 are threaded on the threaded rod 68, the position of nuts 78 and 82 are adjustable with respect to the rod 68. Accordingly, the nut 78 is adjusted such that it engages stop surface 80 just before the slide out room 30 reaches the fully retracted position illustrated in FIG. 1. Similarly, stop nut 82 is adjusted such that it engages stop surface 84 just before the slide out room moves into the fully extended position illustrated in FIG. 2.

In operation, when the slide out room 30 is to be retracted into the main living area in preparation for moving the unit, the inner member 64 is retracted into the outer member 62, thereby pulling the cross plate 40, and therefore retracting room 30, toward the frame member 14. Just prior to the slide out room 30 reaching the fully retracted position illustrated in FIG. 1, stop nut 78 contacts stop surface 80 on the support 70. Upon further retraction of inner member 64 and outer member 62, cross plate 40 pivots counter-clockwise a small amount as the slide out room 30 reaches the fully retracted position. Accordingly, cross plate 40 is pivoted into the FIG. 6 position, thereby tilting the slide out room 30 relative to the main living quarters 22 a small amount sufficient to compress seal 52 between the sealing surface 54 and the sealing area 58, thereby assuring a tight seal therebetween to prevent ingress of rain, moisture, dust and other environmental contaminants into the living quarters as the unit 10 is transported.

When the unit is parked and the slide out room 30 is to be extended, the inner member 64 is extended from outer member 62, thereby pressing the cross plate 40, and therefore the slide out room 30, away from frame member 14. When this occurs, upon initial movement of the cross plate, the spring 74 and/or 76 bias the cross plate 40 back into the substantially vertical orientation illustrated in FIG. 4. Just before the slide out room is moved in the fully extended position, stop nut 82 engages stop surface 84, thereby pivoting the cross plate 40 about the pivots 66 and 72 into the position illustrated in FIG. 7. Accordingly, the slide out room 30 is tilted a slight degree in the clockwise direction, thereby compressing the seal 44 between the sealing surface 46 on flange 48 sealing area 50. Accordingly, a tight seal is assured preventing rain or other moisture from entering into the living quarters. Again, when the room is retracted, movement of the inner member 64 into the outer member 62 an initial small amount sufficient to move the nut 82 away from the stop surface 84 permits the spring 74 and/or 76 to bias the cross plate 40 from the FIG. 7 position to the substantially vertical position illustrated at FIG. 4.

Figures 4, 5, 6, 7:
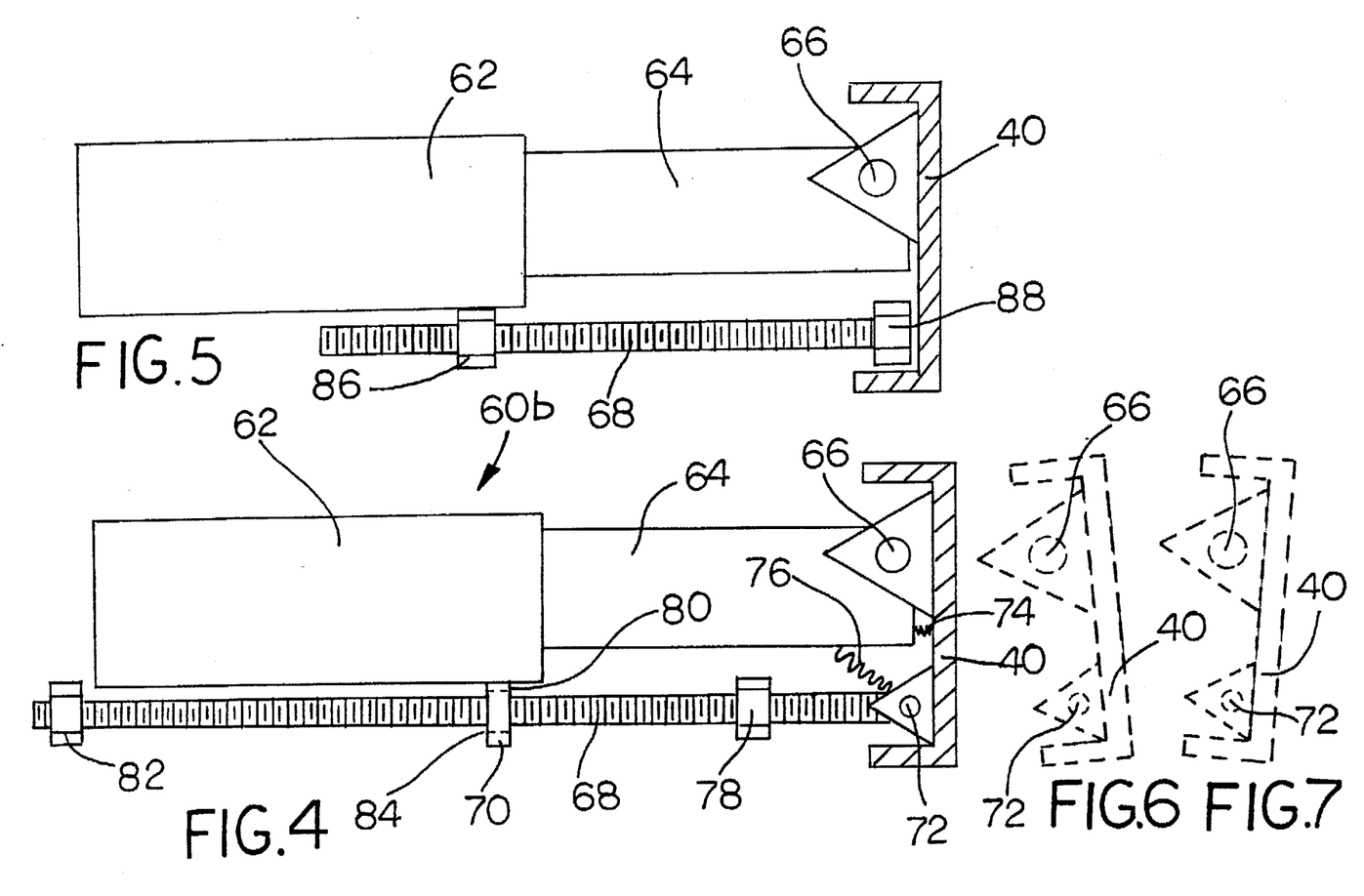

Referring now to the embodiment of FIG. 5, a stop assembly includes a threaded rod 68 threaded into a support 86 carried by outer member 62 and a stop nut 88 fixed to the end thereof adjacent the cross plate 40. Accordingly, cross plate 40 is pivoted to the FIG. 6 position when the inner member 64 is drawn into the outer member 62 when the retractable room 30 is retracted, thereby providing sealing between the seal 52 and the sealing surfaces 54 and sealing area 58. However, when the retractable room is extended, the cross plate 40 moves away from stop nut 88, and accordingly, the slide out room 30 is not cocked or tilted when it reaches the extended position. The FIG. 5 embodiment is used when sealing the room in the extended position is not necessary. The FIG. 5 apparatus does, however, permit sealing of the room during transport, when the unit is most vulnerable to ingress of dirt, moisture, rain and other environmental contaminants.

Figure 8:
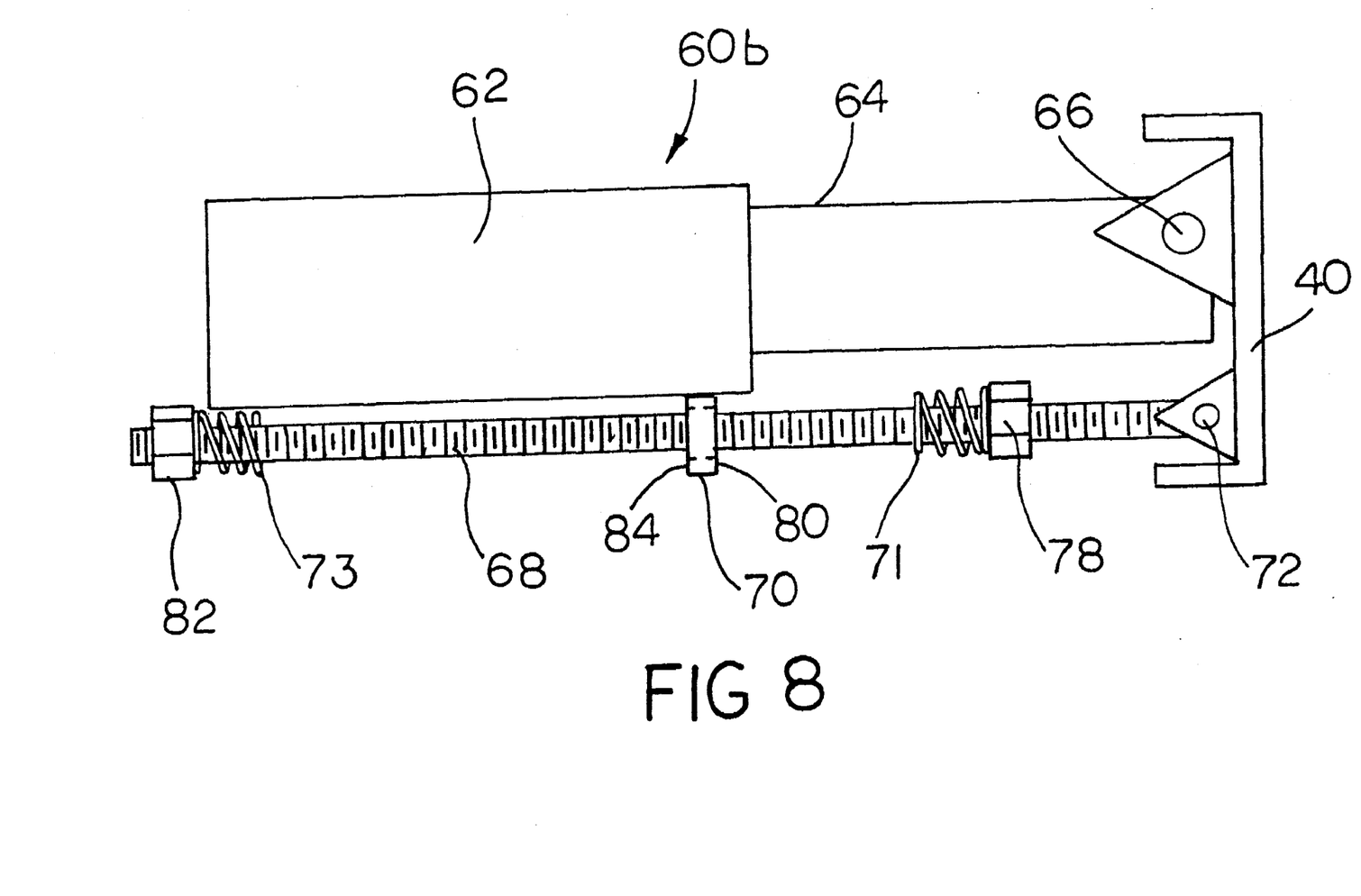
FIG. 8 is a view similar to FIG. 4, but illustrating another embodiment of the invention in which the stop nuts are equipped with stop springs which ease the installation and adjustment of the stop nuts on the threaded rod.
Figure 9:
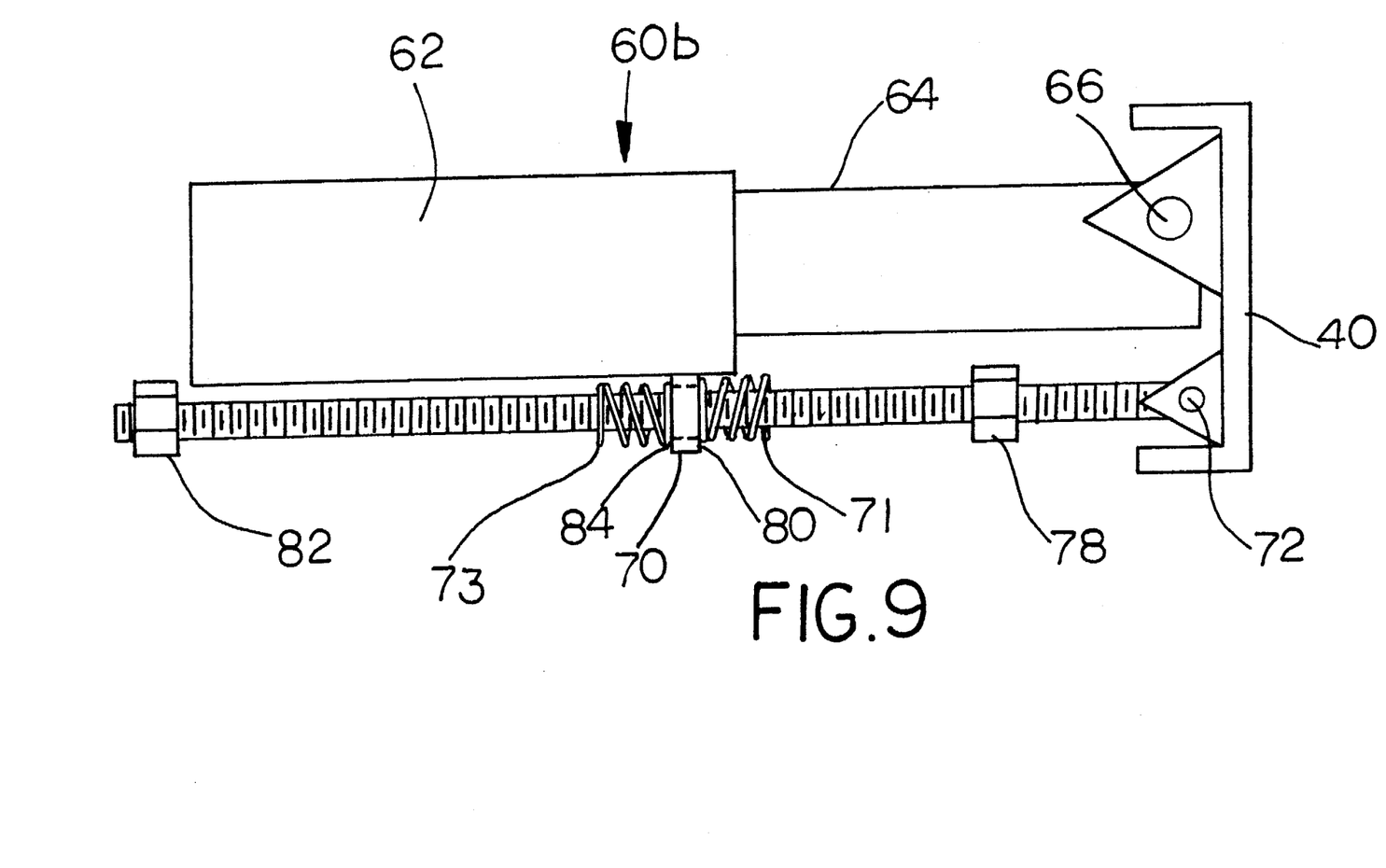
FIG. 9 is a view similar to FIG. 8, but showing the stop springs attached to the opposing stop surfaces of the stop support rather than to the stop nuts.

Referring now to the embodiment of FIGS. 8 and 9, inner member 64 is connected to cross plate 40 through a pivot connection 66. A stop assembly including a threaded rod 68 is slidably received in a support member 70 which is secured to the outer member 62. One end of the rod 68 is pivotally connected to cross plate 40 through a pivot connection 72. The cross plate 40 is biased into the substantially vertical orientation illustrated in FIG. 4 by springs, such as push spring 74 and pull spring 76. The stop assembly further includes a stop nut 78 threadably mounted on threaded rod 68 between pivot 72 and support 70, and a coil spring 71 is placed around rod 68 and is mounted to the surface of nut 78 between nut 78 and support 70. Spring 71 is adapted to engage stop surface 80 on support 70 after the inner member 64 is retracted into outer member 62 a sufficient distance, with spring 71 contacting support 70 immediately prior to the actuation cylinder (not shown) reaching its positive stop or "deadhead" as it travels towards the retracted position. The stop assembly also includes another stop nut 82 threaded on the rod 68 on the portion of the rod that extends through the support 70, and a coil spring 73 placed around rod 68 and mounted to the surface of nut 82 between nut 82 and support 70. The spring 73 is adapted to engage stop surface 84 on support 70 after the inner member 64 is extended from the outer member 52 a sufficient distance, with spring 73 contacting support 70 immediately prior to cylinder 43 reaching its positive stop or "deadhead" as it travels towards the extended position. Springs 71, 73 are preferably commercially available coil springs, although resilient elastomeric washers or Belleville washers may form suitable substitutes. Springs 71 and 73 provide enough biasing force to pivot cross plate 40 when room 30 reaches the retracted or extended positions, respectively, and yet the force applied by cylinder 43 is sufficient to overcome the force of either spring so that the cylinder 43 will reach its positive stop or "deadhead" position. Because the position of nuts 78 and 82 are adjustable with respect to the threaded rod 68, the nuts 78 and 82 normally must be adjusted with some degree of accuracy so that the nuts contact the stop at the same time the cylinder 43 reaches its "deadhead" position. The addition of springs 71, 73 makes the system much less susceptible to minor errors or deviations in the adjustment of nuts 78 and 82. Accordingly, the nut 78 is adjusted such that spring 71 engages stop surface 80 just before the slide out room 30 reaches the fully retracted position illustrated in FIG. 1. Similarly, stop nut 82 is adjusted such that it engages stop surface 84 just before the slide out room moves into the fully extended position illustrated in FIG. 2. Alternatively, as shown in FIG. 9, the stop springs 71, 73 may be attached to the opposing side surfaces 80 and 84, respectively, of stop support 70.

Figure 10:
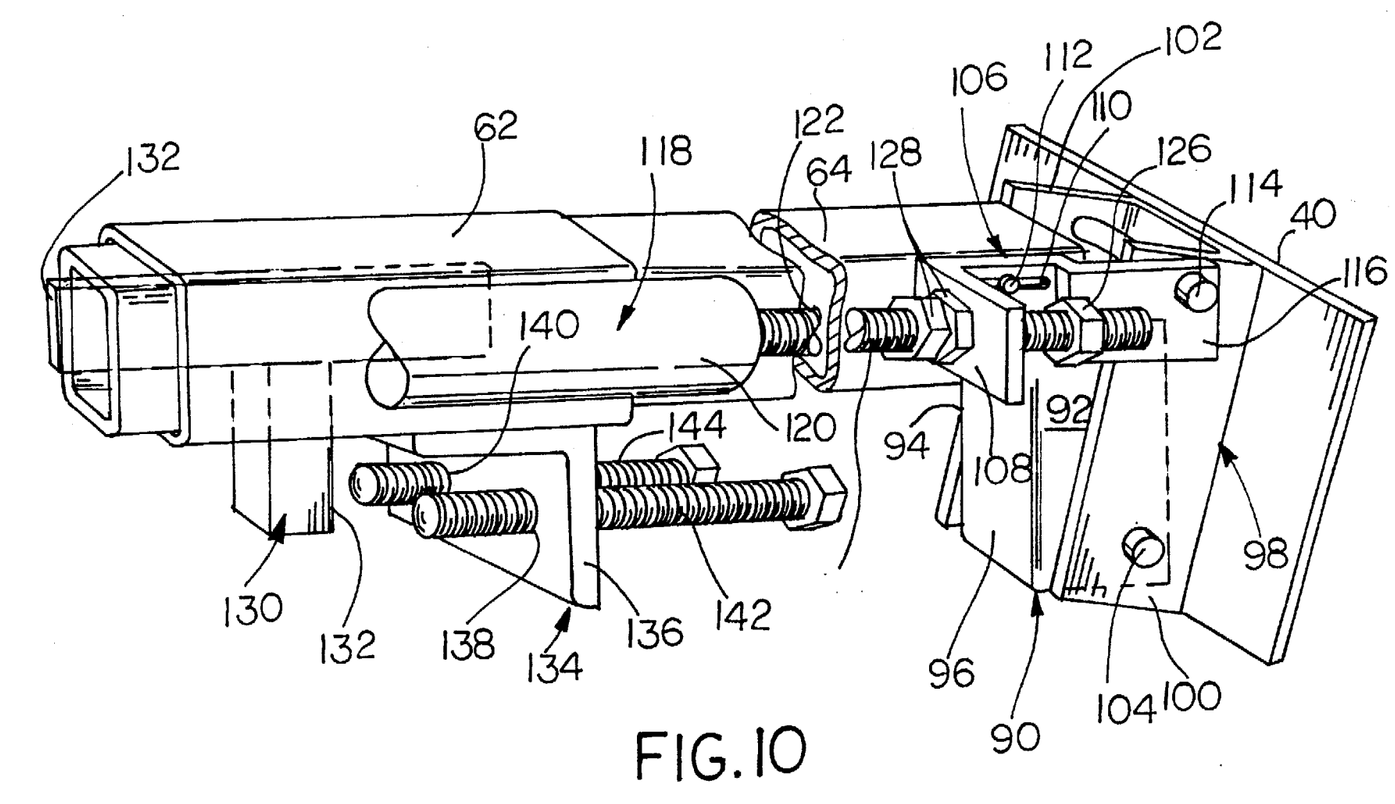
FIG. 10 is view in perspective of still another embodiment of the present invention, illustrating the positions in which various components assume just before the slide out room is moved into the fully extended position.
Figure 11:
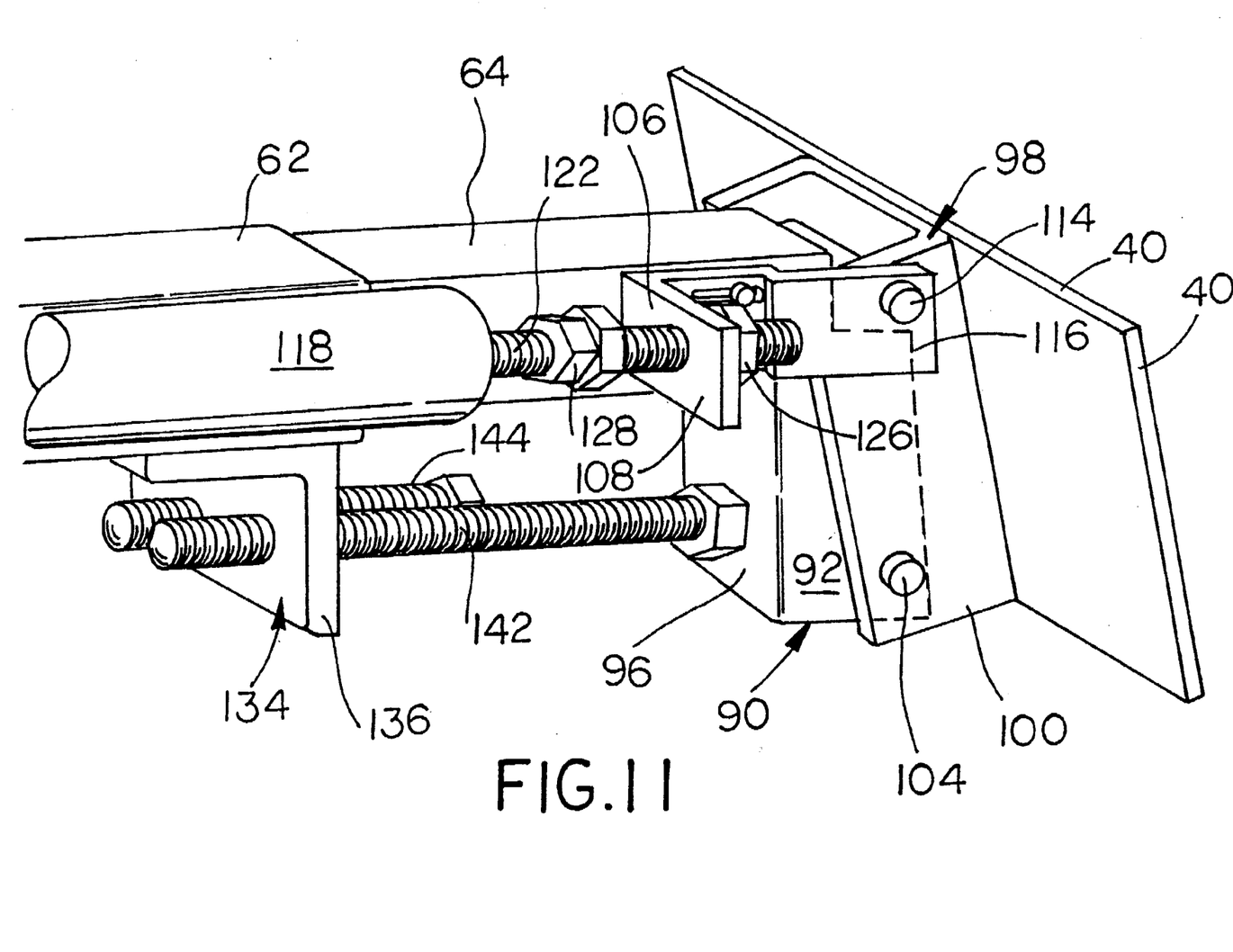
FIG. 11 is a view similar to FIG. 10, but illustrating the various components in the positions which they assume when the slide out room is moved into the fully retracted position.
Figure 12:
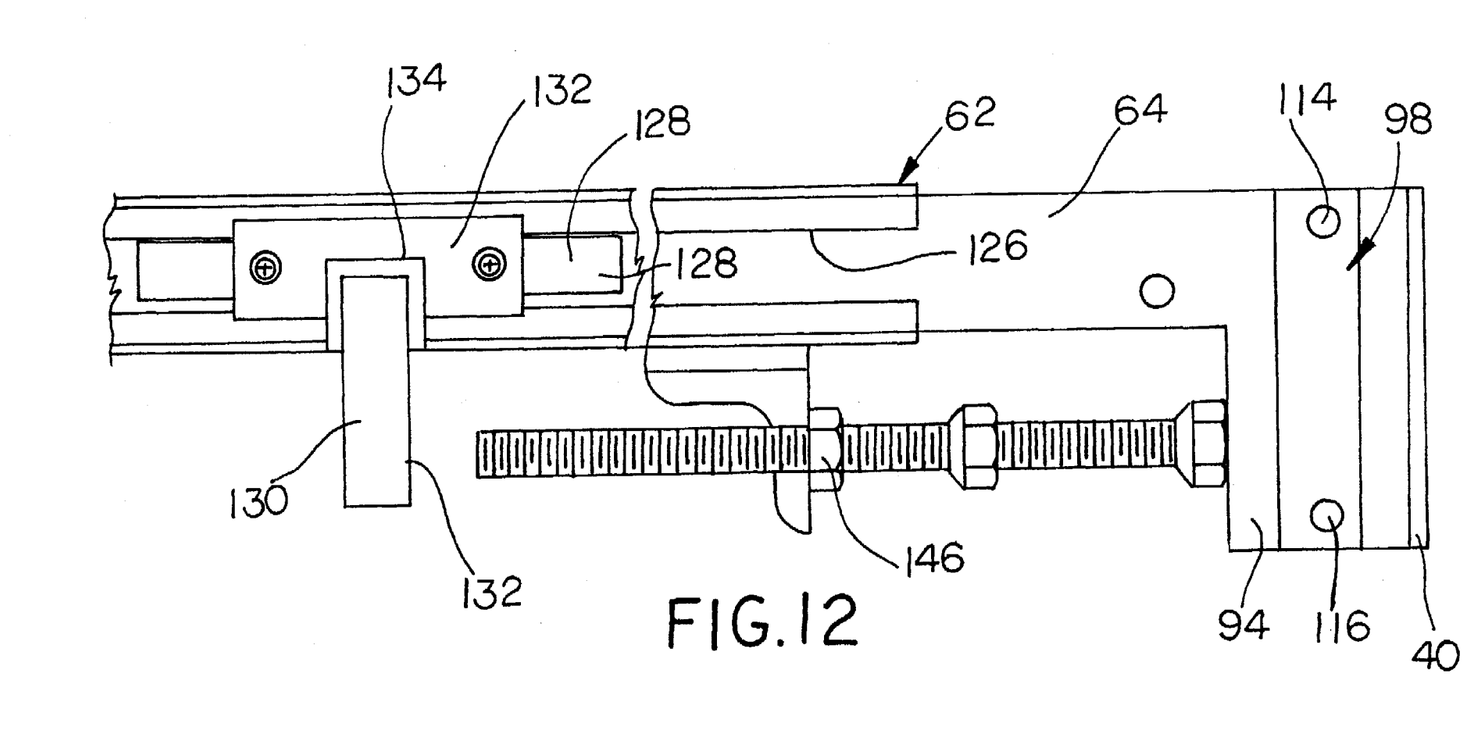
FIG. 12 is a side elevational view of the side of the apparatus illustrated in FIG. 10 opposite to that of which is shown in FIG. 10.

Referring now to the embodiment of FIGS. 10–12, the inner coaxial member 64 terminates in a downwardly extending extension generally indicated by the numeral 90. The extension 90, includes side walls 92, 94 and a rear wall 96, which defines a stop surface which will hereinafter be explained. Cross plate 40 is secured to a generally U-shaped mounting bracket generally indicated by the numeral 98, which includes spaced parallel side frame members 100, 102. A pivot pin 104 pivotally connects bracket 98 to the extension 90 by extending through the side members 100, 102 and the side walls 92, 94, to thereby permit cross plate 40 (and therefore the slide out room 30) to pivot or tilt relative to the inner and outer coaxial member 64, 62. A control member in the form of a bracket generally indicated by the numeral 106 includes a transversely extending portion 108 extending transversely with respect to the members 62, 64. The bracket 106 is provided with a slot 110 which slidably engages a pin 112 projecting from the inner coaxial member 64 adjacent the extension 90 to thereby slidably connect the brackets 106 to the inner coaxial member 64. Another pivot connection consisting of a pivot pin 114 pivotally connects the bracket 106 to the U-shaped bracket 98. The pivot pin 114 extends through dog-leg portion 116 of the bracket 106 and through the side members 100, 102 of the U-shaped bracket 98. The transversely extending portion 108 extends from one end of the dog-leg portion 116 opposite the end through which pivot pin 114 extends.

A conventional hydraulic actuated cylinder generally indicated by the numeral 118 is rigidly secured to the outer coaxial member 62. The actuator 118 includes a conventional hydraulic cylinder 120 and a piston rod 122 which includes a threaded portion 124 at one end thereof. Of course, the portion of the piston rod 124 received within the cylinder 120 is not threaded. The threaded portion 124 extends through an aperture in transversely extending portion 108 of bracket 106, and is provided with stop nuts 126, 128 on opposite sides of transversely extending portion 108. Accordingly, when the piston rod 122 is extended from the cylinder 118 by application of hydraulic pressure to cylinder 118, nuts 128 will engage portion 108 of the bracket 106 and further movement of the piston rod will first cause the pin 112 to engage the end of the slot 110, and will thereafter cause the inner coaxial member 64 to extend from the outer coaxial member 62. Conversely, when the piston rod 122 is retracted into cylinder 118, the stop nut 126 will first engage transversely extending portion 108 of bracket 106 after the piston has retracted a predetermined amount, further movement of the piston rod 122 will move the bracket 106 toward the opposite end of the slot 110, after which force applied through the bracket 106 will cause the inner coaxial member 64 to retract within outer coaxial member 62.

Referring now to FIGS. 10, 11 and 12, the outer coaxial member 62 is provided with a longitudinally extended aperture or slot generally indicated by the numeral 126. The inner coaxial member 64 is provided with a projecting portion 128 which extends through the aperture or slot 126, and a downwardly projecting extension 130 which is secured to the projecting portion 128 via a base plate 132. The extension 130 carries a stop surface 132 on the side thereof facing the plate 40.

An L-shaped bracket 134 is secured to the lower surface of the outer coaxial member 62 adjacent the end thereof from which the inner coaxial member 64 extends, and includes a downwardly projecting leg 136. The leg 136 is provided with a pair of threaded apertures 138, 140 each of which threadedly receive a corresponding threaded bolt 142, 144. Locknuts 146 prevent the bolts 122, 134 from loosening accidently. Accordingly, the position of the bolts 142, 144 relative to the outer coaxial member 62 may be adjusted by rotating the bolts 142, 144. It will be noted that the bolt 144 is in substantial alignment with the extension 130, and that the bolt 142 is in substantial alignment with the extension 90.

In operation, as has been described above, hydraulic actuator 118 extends and retracts the inner coaxial member 64 relative to the outer coaxial member 62 and, because the base plate 40 is mounted on the inner coaxial member 64, extension and retraction of the inner coaxial member 64 also extends and retracts the slide out room 30. As the slide out room 30 approaches the fully extended position illustrated in FIG. 10, the stop surface on projection 130 engages the end of bolt 144, thereby locking the inner coaxial member 64 against further extension from the outer coaxial member 62. However, because of the slot 110, the piston 122 may move the bracket 106 relative to the inner coaxial member 64. Because of the substantially horizontal pivot pins 114 and 104, movement of the bracket 106 relative to the inner coaxial member 64 pivots the base plate 40 about the pivot pin 104, thereby pivoting or tilting the slide out room 30 in the clockwise direction, thereby permitting flange 48 to compress the seal 44 to form a fluid tight connection.

When the slide out room 30 is retracted, the hydraulic actuator 118 is operated to retract piston 122 into the cylinder 120, thereby moving nut 126 into engagement with portion 108 of bracket 106 and thereafter retracting the inner coaxial member 64 into the outer coaxial member 62 so that the slide out room 30 is moved into the retracted position illustrated in FIG. 11. As the slide out room moves into the fully retracted position, the stop surface on rear wall 96 on extension 90 engages the end of bolt 142, thereby preventing additional inward movement of the inner coaxial member 64 into the outer coaxial member 62. When this occurs, bracket 106 may be moved relative to the inner coaxial member 64 due to the slot 110. Accordingly, further retraction of the piston 122 into the cylinder 120 causes the bracket 106 to pivot about pin 114, thereby causing the base plate 40 to pivot about the pivot pin 104 in a counter clockwise direction. Accordingly, flange 56 compresses the seal 52 against the sealing surface 58. Accordingly, only two relatively short stop bolts 142, 144 are necessary, thereby eliminating alignment problems, and the bolts are relatively easily accessible from the exterior of the vehicle for adjustment purposes.

It will be appreciated that the foregoing is presented by way of illustration only, and not by way of any limitation and that various alternatives and modifications may be made to the described embodiment without departing from the spirit and scope of the invention.

What is claimed:

1. Mobile living quarters comprising a frame, structure mounted on said frame defining a main living area, a retractable room moveable relative to said main living area between a retracted position retracted into the main living area and an extended position extended from the main living area to provide an auxiliary living area, a seal between said retractable room and said structure, and an actuating device moving said retractable room between said retracted and extended positions, said actuating device including a pivot mechanism pivoting said retractable room relative to said structure in response to movement of said retractable room into one of said positions to thereby compress said seal between said retractable room and said structure.

2. Mobile living quarters as claimed in claim 1, wherein said retractable room includes a flange projecting outwardly from said auxiliary living area defining a sealing surface, said structure including a sealing area, said seal being mounted between said sealing surface and said sealing area whereby upon pivoting of said retractable room relative to said structure said seal is compressed between said sealing surface and said sealing area.

3. Mobile living quarters as claimed in claim 1 wherein said retractable room includes a pair of flanges projecting outwardly from said auxiliary living area and spaced apart along the direction of movement of said retractable room, each of said flanges defining a sealing surface engageable with a corresponding sealing area on said structure, said seal being mounted between one of said sealing surfaces and its corresponding sealing area, and a sealing member mounted between the other sealing surface and the other sealing area, said pivot mechanism pivoting said retractable room in one direction as the retractable room is moved into the retracted position to compress the seal between said one sealing surface and its corresponding sealing area and pivoting said retractable room in the opposite direction to compress the sealing member between the other sealing surface and the other sealing area as the retractable room is moved into the extended position.

4. Mobile living quarters as claimed in claim 2, wherein said seal is compressed between said sealing surface and said sealing area as the retractable room is moved into the retracted position.

5. Mobile living quarters as claimed in claim 2, wherein said actuating device includes a pair of coaxial, extensible members, one of said coaxial members being mounted on said frame, the other coaxial member being secured to the retractable room, said pivot mechanism including a pivot connection between said other coaxial member and said retractable room.

6. Mobile living quarters as claimed in claim 5, wherein said pivot mechanism includes a stop assembly, said retractable room being movable relative to the stop assembly, said stop assembly engaging said retractable room as the retractable room is moved into said retracted position whereby movement of the retractable room after engagement with the stop member pivots the retractable room relative to said frame about said pivot connection to cause said sealing surface to compress the seal against the sealing area.

7. Mobile living quarters as claimed in claim 6, wherein said stop assembly includes an elongated member having an end, said elongated member being secured to said one coaxial member and projecting beyond an end of the one coaxial member, said other coaxial member extending from said end of the one coaxial member, said retractable room engaging the end of the elongated member when moved to a predetermined position by movement of said other coaxial member toward said one coaxial member to thereby pivot said retractable room upon movement of the retractable room past the predetermined position.

8. Mobile living quarters as claimed in claim 5, said retractable room includes a pair of flanges projecting outwardly from said auxiliary living area and spaced apart along the direction of movement of said retractable room, each of said flanges defining a sealing surface engageable with a corresponding sealing area on said structure, said seal being mounted between one of said sealing surfaces and its corresponding sealing area, and a sealing member mounted between the other sealing surface and the other sealing area, said pivot mechanism pivoting said retractable room in one direction as the retractable room is moved into the retracted position to compress the seal between said one sealing surface and its corresponding sealing area and pivoting said retractable room in the opposite direction to compress the sealing member between the other sealing surface and the other sealing area as the retractable room is moved into the extended position, said pivot mechanism including a stop assembly controlling pivoting of said retractable room.

9. Mobile living quarters as claimed in claim 8, wherein said stop assembly includes a control member pivotally connected to said retractable room.

10. Mobile living quarters as claimed in claim 9, wherein said control member is slidably mounted on said frame.

11. Mobile living quarters as claimed in claim 10, wherein said stop assembly includes a pair of stops carried on the control member, one of said stops engaging a stop surface fixed relative to said frame to pivot said retractable room in said one direction as the retractable room is moved into the retracted position, the other stop engaging another stop surface fixed relative to said frame to pivot said retractable room in said other direction as the retractable room is moved into the extended position.

12. Mobile living quarters as claimed in claim 11, including a resilient member attached to each of said pair of stop surfaces resiliently engaging said stops.

13. Mobile living quarters as claimed in claim 11, wherein said control member is slidably mounted on said one extendible member, said stop surfaces being mounted on said other extendible member.

14. Mobile living quarters as claimed in claim 8, wherein said stop assembly includes a pair of stop surfaces mounted on said one coaxial member, a pair of stops carried by the other coaxial member, one of said stops engaging a corresponding one of the stop surfaces upon movement of the slide out room toward the retracted position, the other of said stops engaging the other stop surface upon movement of the slide out room to the extended position, and a control member slidably mounted on said other coaxial member, said control member pivoting said slide out room in said one direction upon engagement of said one stop with said one stop surface and in said other direction upon engagement of the other stop with the other stop surface.

15. Mobile living quarters as claimed in claim 14, wherein a pivot member pivotally connects said control member with the retractable room.

16. Mobile living quarters as claimed in claim 15, wherein an actuator is mounted on said one coaxial member, said fluid actuator having an actuating rod connected to said control member.

17. Mobile living quarters as claimed in claim 14, wherein said control member includes a bracket slidably mounted on said other coaxial member through a pin and slot connection to permit said bracket to slide relative to the other coaxial member.

18. Mobile living quarters as claimed in claim 14, wherein said stop surfaces are defined on axially spaced, outwardly projecting extensions projecting from the other coaxial member.

19. Mobile living quarters as claimed in claim 18, wherein said one coaxial member includes a longitudinally extending aperture, one of said extensions extending through said aperture to engage the other coaxial member.

20. Mobile living quarters as claimed in claim 14, wherein a support member is mounted on said one coaxial member, said stops being supported by said support member and projecting axially with respect to said coaxial members.

21. Mobile living quarters as claimed in claim 20, wherein said stops are adjustably mounted on said support member.

22. Mobile living quarters as claimed in claim 20, wherein said stop surfaces are defined on axially spaced, outwardly projecting extensions projecting from the other coaxial member, said support member extending between said extensions.

23. Mobile living quarters comprising a frame, structure mounted on said frame defining a main living area, a retractable room moveable relative to said main living area between a retracted position retracted into the main living area and an extended position extended from the main living to provide an auxiliary living area, a seal between said retractable room and said structure, an actuating device moving said retractable room between said retracted and extended positions, and pivot means for pivoting said retractable room relative to said structure as said retractable room is moved into one of said positions.

24. Mobile living quarters as claimed in claim 23, wherein said pivot means pivots said retractable room in one direction as said retractable room is moved into said extended position and in the opposite direction as the retractable room is moved into the retracted position.

25. Mobile living quarters as claimed in claim 23, wherein said actuating device includes a pair of coaxial, extensible members, one of said pair of extensible members being mounted on said frame, the other of said pair of extensible members being secured to the retractable room, said pivot means including a pivot connecting the retractable room to the other extensible member.

26. Mobile living quarters as claimed in claim 25, wherein said pivot means includes a control mechanism pivoting said retractable room about said pivot.

* * * * *